United States Patent
Bucher et al.

(10) Patent No.: US 7,076,348 B2
(45) Date of Patent: Jul. 11, 2006

(54) DATA COLLECTION APPARATUS AND METHOD

(75) Inventors: Corey W. Bucher, Wrightstown, WI (US); Arnold W. Anderson, Jr., Little Suamico, WI (US)

(73) Assignee: Ariens Company, Brillion, WI (US)

( * ) Notice: Subject to any disclaimer, the term of this patent is extended or adjusted under 35 U.S.C. 154(b) by 344 days.

(21) Appl. No.: 10/657,951

(22) Filed: Sep. 9, 2003

(65) Prior Publication Data
US 2005/0053447 A1    Mar. 10, 2005

(51) Int. Cl.
*G06F 19/00* (2006.01)
(52) U.S. Cl. .............................. 701/35; 701/29; 701/50
(58) Field of Classification Search ................. 701/35, 701/29, 50; 340/438
See application file for complete search history.

(56) References Cited

U.S. PATENT DOCUMENTS

| | | | |
|---|---|---|---|
| 3,755,750 A * | 8/1973 | Heberling | 327/558 |
| 4,296,409 A | 10/1981 | Whitaker et al. | |
| 4,376,298 A | 3/1983 | Sokol et al. | |
| 4,551,801 A | 11/1985 | Sokol | |
| 5,623,247 A * | 4/1997 | Cardillo | 340/457.4 |
| 5,644,491 A | 7/1997 | Fiske et al. | |
| 5,657,224 A * | 8/1997 | Lonn et al. | 701/29 |
| 5,721,540 A | 2/1998 | Ellis | |
| 5,743,347 A | 4/1998 | Gingerich | |
| 5,805,079 A | 9/1998 | Lemelson | |
| 5,934,051 A | 8/1999 | Hahn | |
| 5,955,942 A * | 9/1999 | Slifkin et al. | 340/436 |
| 5,974,347 A | 10/1999 | Nelson | |
| 6,009,358 A | 12/1999 | Angott et al. | |
| 6,082,084 A | 7/2000 | Reimers et al. | |
| 6,195,605 B1 * | 2/2001 | Tabler et al. | 701/50 |
| 6,408,233 B1 | 6/2002 | Solomon et al. | |
| 6,609,357 B1 | 8/2003 | Davis et al. | |
| 6,646,397 B1 * | 11/2003 | Discenzo | 318/439 |
| 2005/0024195 A1 * | 2/2005 | Bai | 340/457 |
| 2005/0144923 A1 * | 7/2005 | Melone et al. | 56/14.7 |

OTHER PUBLICATIONS

Web page http://www.somat.com/applications/articles/ji_case.htm, "Portable Data Acquisition System Helps Case Corporation Test Four-Wheel-Drive Agricultural Tractor in the Field." Aug. 8, 2004.*

(Continued)

*Primary Examiner*—Thomas G. Black
*Assistant Examiner*—Marie A Weiskopf
(74) *Attorney, Agent, or Firm*—Michael Best & Friedrich LLP

(57) ABSTRACT

A monitoring system for an outdoor power implement. The monitoring system comprises an accelerometer, a GPS receiver, a processing module, and a storage device. The accelerometer collects impact force data of the outdoor power implement. The GPS receiver collects position data of the outdoor power implement. The processing module is coupled to the accelerometer and the GPS receiver and has a filter module operable to receive the impact force data from the accelerometer, filter the impact data, and provide filtered impact data. The filter module comprises a resistor capacitor filter circuit having a cutoff frequency at 50 Hz. The processing module also has a data extraction module operable to receive the positioning data from the GPS receiver. The storage device is coupled to the processing module and is operable to record the filtered impact data and the positioning data. The outdoor power implement may include a lawnmower.

15 Claims, 6 Drawing Sheets

OTHER PUBLICATIONS

Web page http://www.somat.com/applications/articles/ji_case.htm, "Portable Data Acquisitions System Helps Case Corporation Test Four-Wheel-Drive Agricultural Tractor in the Field," downloaded Mar. 6, 2003.

Web page http://www.somat.com/products/data_acquisition/edaq_purchase.htm, "eDAQ Field Computer System," downloaded Mar. 6, 2003.

Web page http://www.lat-lon.com/productsandservices.asp, downloaded Mar. 6, 2003.

IOTech sales brochure, "DBK70™ Vehicle Network Interface for DaqBook, WaveBook, LogBook, ZonicBook, & DaqBoard Systems," pp. 192-196.

Web page http://www.etrackerinc.com/applications.htm, "Wireless Asset Management," downloaded Mar. 6, 2003.

* cited by examiner

DATA COLLECTION APPARATUS AND METHOD

FIELD OF THE INVENTION

This invention relates to data collection apparatus and methods, and more particularly to data collection apparatus and methods for outdoor power implements.

BACKGROUND OF THE INVENTION

Power implements commonly include devices such as utility tractors, lawnmowers, landscaping equipment, trimmers, tillers, snow throwers, or other similar implements, and are used for general outdoor applications such as landscaping, gardening, lawn care, or snow removal. The implement includes at least one mechanism to perform the desired application. If the implement is self-propelled, the implement also includes a drive mechanism to propel the implement. For example, if the implement is a lawnmower, the lawnmower may include a drive mechanism, such as an engine and driven wheels, to propel the lawnmower across a surface, and a cutting blade to cut vegetation.

SUMMARY OF THE INVENTION

The present invention provides a monitoring system for an outdoor power implement. The monitoring system comprises an accelerometer, a GPS receiver, a processing module, and a storage device. The accelerometer collects impact force data of the outdoor power implement. The GPS receiver collects position data of the outdoor power implement. The processing module is coupled to the accelerometer and the GPS receiver and has a filter module operable to receive the impact force data from the accelerometer, filter the impact data, and provide filtered impact data. The processing module also has a data extraction module operable to receive the positioning data from the GPS receiver. The storage device is coupled to the processing module and is operable to record the filtered impact data and the positioning data. The storage device may include an electrically erasable programmable read-only memory. The position data may include location, time and speed.

In some aspects and in some constructions, the outdoor power implement may include a lawnmower, such as a riding lawnmower. The monitoring system is in the form of a self-contained modular unit, and the monitoring system further comprises a durable housing enclosing components of the monitoring system and protecting the components from environmental conditions. The monitoring system is removably connected to the lawnmower. The lawnmower includes an electrical system having a power source, and the monitoring system includes a power take-off for connecting the monitoring system to the power source of the outdoor power implement and providing power to the monitoring system. The monitoring system may automatically being recording data in the storage device in response to sensing that the lawnmower is in use. Indicators of use may include measuring electrical voltage from the electrical system of the lawnmower, movement of the lawnmower sensed by the GPS receiver, and movement of the lawnmower sensed by the accelerometer.

The monitoring system may include a user interface including a visual display and input buttons for interfacing with the monitoring system. The monitoring system may also include a communication module coupled to the processing module and operable to transfer data from the monitoring system to an external device.

The filter module filters the impact force data to provide useful data for analysis. The filter module may comprise a resistor capacitor filter circuit having a cutoff frequency at 50 Hz. The filter generally removes impact forces occurring at a frequency greater than 50 Hz. The filter module may also comprise a weighed averaging module configured to generate a weighed average using the impact force data.

Two possible uses for the monitoring system include testing and monitoring outdoor power equipment. The monitoring system may be used to test the design of new outdoor power implements. The stresses and strains experienced by the implement during testing may be analyzed to evaluate the design. The monitoring system may also be used to monitor the use of outdoor power implements, such as commercial lawnmower that are generally operated by employees at remote locations.

Other features and advantages of the present invention will become apparent to those skilled in the art upon review of the following detailed description and drawings.

Figure 1:
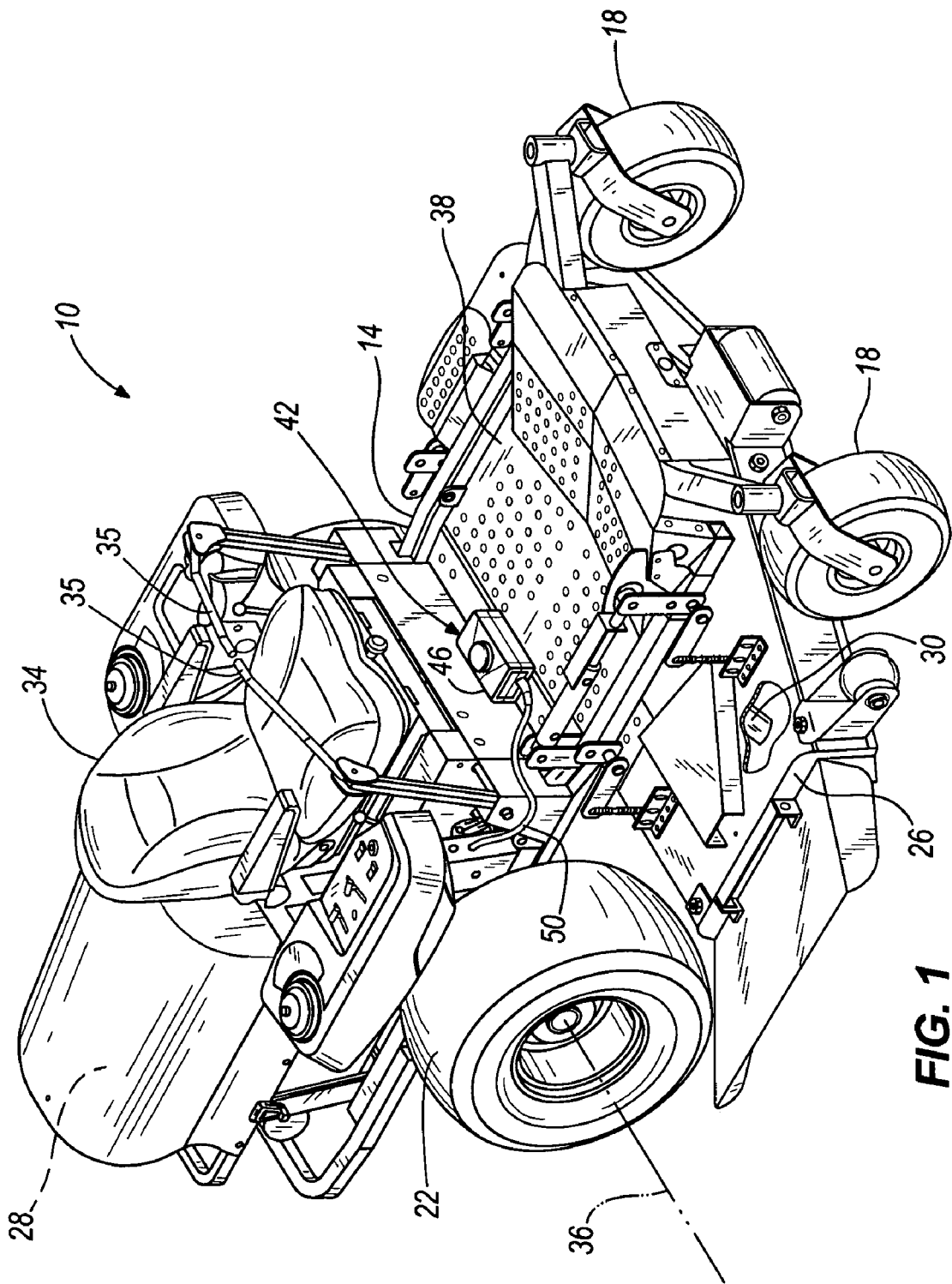
FIG. 1 is a perspective view of a monitoring system mounted on a lawnmower.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates a lawnmower 10 including a chassis 14, front wheels 18 and rear wheels 22 supporting the chassis 14, a mower deck 26 supported by the chassis 14, an engine 28 supported by the chassis 14, a cutting implement 30 disposed under the mower deck 26 and driven by the engine 28, and a seat 34 supported by the chassis 14 for an operator to sit in. The engine 28 may be enclosed within a housing. In the illustrated construction, the lawnmower 10 is a belly-mount zero turn radius mower having a pair of control levers 35 for the independent forward and reverse operation of the front or rear wheels. The invention is not limited to the illustrated lawnmower 10 and may alternatively be embodied in a front mount mower or other power implement.

In the illustrated construction, the lawnmower 10 does not include a suspension. The rear wheels 22 rotate about a rotational axis 36 which is fixed with respect to the chassis 14. Because the lawnmower is suspension-less, the chassis 14 directly absorbs the forces when the wheels 18, 22 contact an object. Examples of objects commonly encountered by a lawnmower include curbs, rocks, holes, trees, or other similar man-made or natural objects. In a vehicle with a suspension, the suspension at least partially decreases forces absorbed by the chassis to reduce the shock and stresses exposed to the chassis. A chassis of a suspension-less vehicle is generally exposed to greater forces than a similar vehicle having a suspension.

The lawnmower 10 includes a foot rest 38 supported by the chassis and a monitoring system 42 removably connected to lawnmower 10 near the foot rest 38. The monitoring system 42 monitors performance and movement of the lawnmower 10, and stores information documenting the performance and movement of the lawnmower 10 for analysis. It should be understood that the monitoring system 42 may be connected to other types of outdoor power implements, besides lawnmowers, to monitor performance and movement of the outdoor power implement. The lawnmower 10 is merely one example of an outdoor power implement with which the monitoring system 42 may be used. Also, the illustrated construction shows the monitoring system 42 being used with a suspension-less lawnmower 10, however, in other constructions, the monitoring system 42 may also be used on vehicles having suspensions, such as golf carts, or other similar outdoor power implements.

In the illustrated construction, the monitoring system 42 is mounted to the lawnmower 10 in a centrally located position. The monitoring system 42 may be positioned on other portions of the lawnmower 10, but optimal results may be achieved if the monitoring system 42 is centrally located between the wheel base of the lawnmower 10. Rigidly mounting the monitoring system 42 to the lawnmower 10 may increase the accuracy of readings from the monitoring system 42 of the forces and movement experienced by the lawnmower 10.

The monitoring system 42 is a self-contained modular unit having a housing 46 enclosing the components of the monitoring system 42. The term "self-contained modular unit" is defined as a single unit that is interchangeable between multiple lawnmowers 10, or other outdoor power implements. For example, the unit may be easily connected to a first lawnmower, removed from the first lawnmower, and connected to a second lawnmower. A power cord 50 extends from the housing 46 and electrically connects to the electrical power system of the lawnmower 10 to receive electrical power to power the monitoring system 42. In alternative constructions, the monitoring system may be battery powered, and may not require a power cord.

Figure 2:
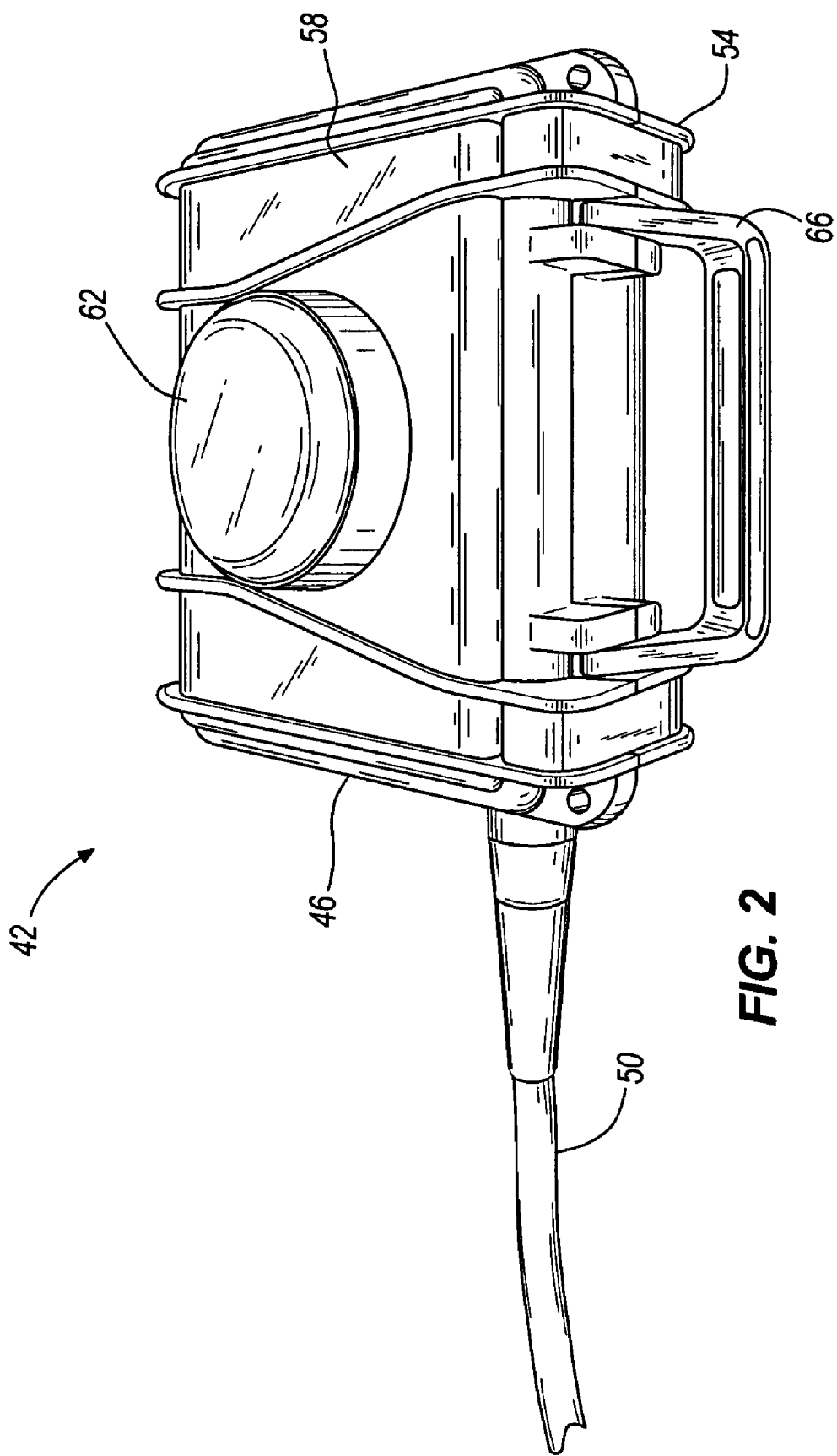
FIG. 2 is a perspective view of the monitoring system of FIG. 1.

FIG. 2 illustrates the monitoring system 42 removed from the lawnmower 10. The power cord 50 extends from the housing 46 and includes electrical connections that are connectable to the electrical system of the lawnmower 10 (FIG. 1). The housing 46 includes a base 54 connected to a cover 58. The housing 46 also includes a handle 66 to facilitate movement of the monitoring system 42 when the system is disconnected from the lawnmower 10.

The monitoring system 42 includes accelerometers to sense forces or shock values exerted on the lawnmower 10 and a GPS system to sense the overall movement of the lawnmower 10, such as positioning, direction and speed. The monitoring system 42 records the data from the accelerometers and GPS system with respect to time. FIG. 2 also illustrates a GPS receiver 62 connected to the top of the cover 58. The GPS receiver 62 generally senses the speed, direction, and location of the lawnmower 10, and may also sense the ambient temperature. An example of an acceptable GPS receiver 62 includes a GPS 16 OEM Sensor, available from Garmin International, Inc., of Olathe, Kans.

Figure 3:
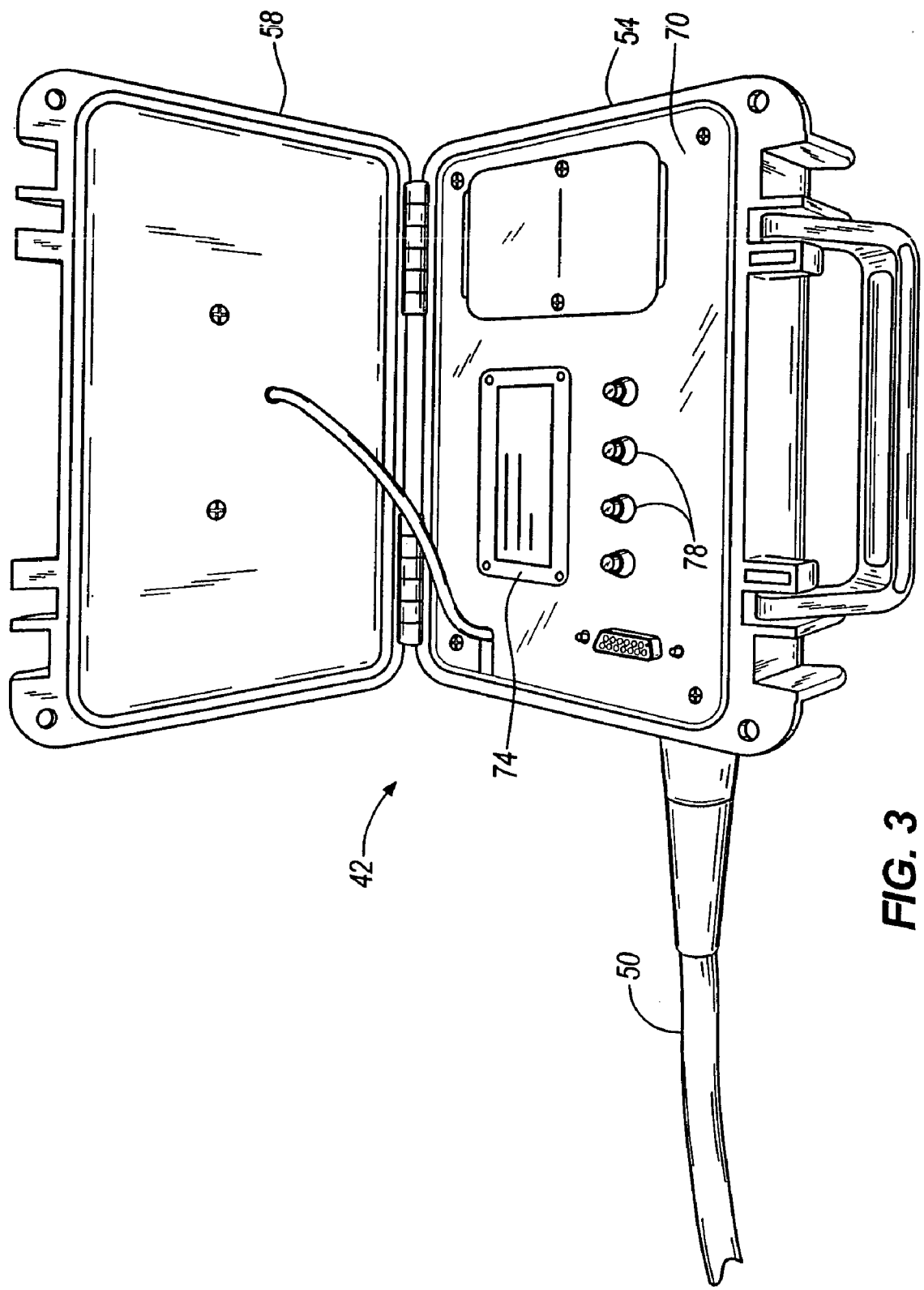
FIG. 3 is a perspective view of the monitoring system of FIG. 1.

As shown in FIG. 3, the cover 58 is opened exposing a user interface including a control panel 70. The control panel 70 includes a display screen 74 and input buttons 78. In the illustrated construction, the display screen 74 is an LCD screen displaying multiple lines of text. The input buttons 78 allow an operator to directly interact with the monitoring system 42 and view data recorded by the monitoring system 42. The operator may use the control panel 70 to enter information such as operator identification data, job identification data and machine identification data into the monitoring system 42. The housing 46 may include a tamper resistant device to prevent the housing 46 from being opened by unauthorized persons, and to prevent the data recorded within the monitoring system 42 from being altered. The tamper resistant device may include a lock, a seal, a bracket or other similar devices. A lock may secure the cover 58 to the base 54 to prevent the housing 46 from being opened without authorization.

Figure 4:
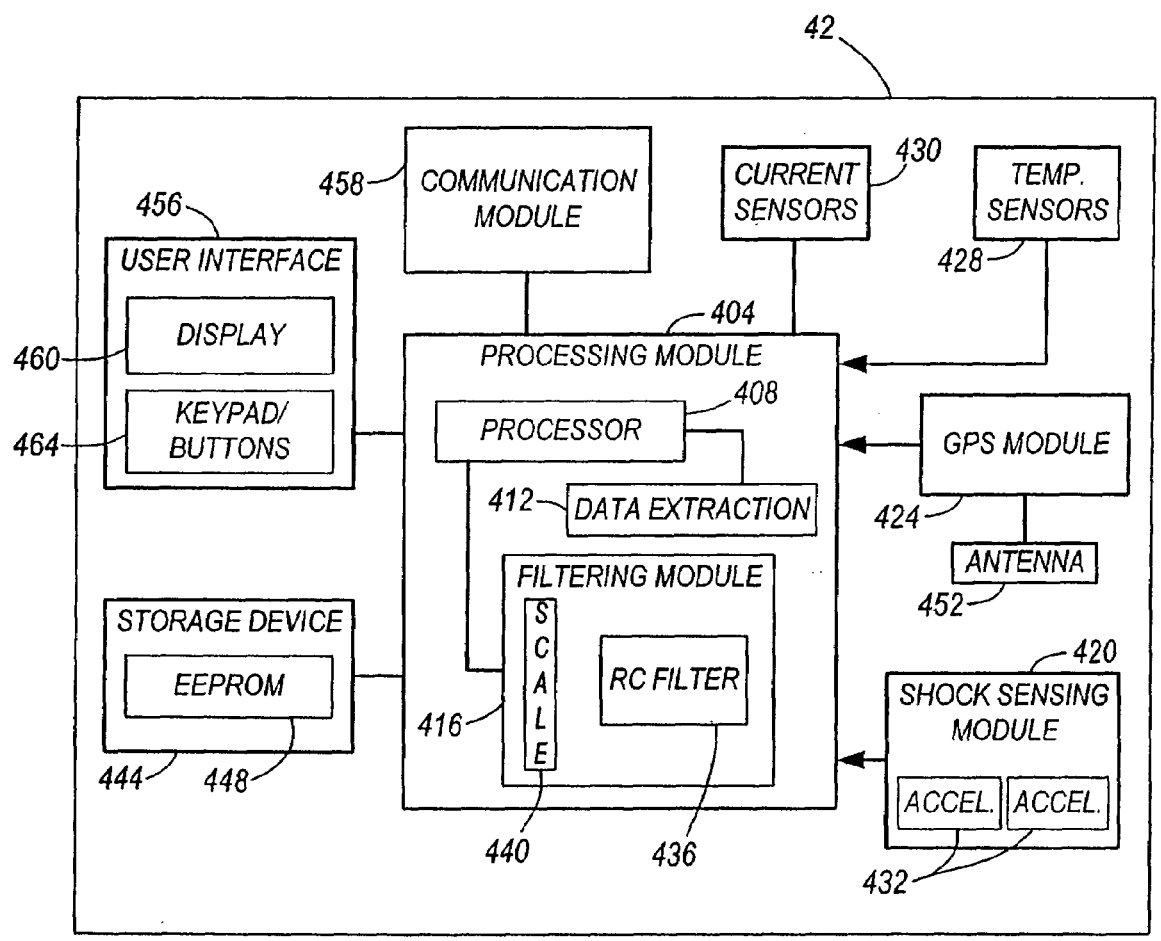
FIG. 4 illustrates a system block diagram of a monitoring system according to the present invention.

FIG. 4 illustrates a system block diagram of the monitoring system 42. The monitoring system 42 includes a processing module 404 that manages the operations and the data of the system 42. The processing module 404 also includes a processor or micro-controller 408 configured to process data such as data that comes from a data extraction module 412 and a filter module 416. Micro-controller 16F877 from MicroChip Technology, Inc. of Chandler, Ariz. is an exemplary micro-controller. The processing module 404 primarily receives data from a plurality of signal devices such as a movement or shock sensing module 420, a global positioning system or sensing ("GPS") module 424 such as the GPS receiver 62 (FIG. 2), a temperature sensor 428, and a current sensor 430 that detects a presence of electrical current in the system 42.

The monitoring system 42 also includes a timer for monitoring an operational time period that the lawnmower is in operation. The timer is coupled to the processing module 404 and time data from the timer is received by the processing module 404. The monitoring system 42 may use the time data to process, compare, and store the other data received by the processing module 404 with respect to time. The timer may also include a clock, stop watch, time sensor, or other similar time keeping device.

The shock sensing module 420 includes a pair of accelerometers 432 that are configured to sense or monitor the shock experienced by the system 42 or the shock experienced by the lawnmower 10 (FIG. 1). Each accelerometer 432 may sense shock forces along one or two directions or axes. For example, the first accelerometer 432 may be configured to monitor a forward-backward shock (or horizontal acceleration) and a side-to-side shock (or lateral acceleration) experienced by the lawnmower 10, while the second accelerometer 432 may be configured to monitor an up-down shock (or a vertical acceleration). In another construction, each accelerometer 432 may be configured to monitor two shock directions or axes, and thus two of the accelerometers 432 will monitor a common direction or axis. For example, one accelerometer 432 may monitor horizontal and vertical shock or acceleration, and the other accelerometer 432 may monitor lateral and vertical shock or acceleration. Generally, the accelerometers 432 monitor directions or axes that are perpendicular to or independent of each other. For example, the accelerometers 432 may measure shock forces along standard X-Y-Z axes. The accelerometers 432 measure the shock value forces in G's, with one G representing the force of gravity. Examples of accelerometers that may be used with the monitoring system include ADXL-210 and ADXL-202 Accelerometers available from Analog Devices, of Norwood, Mass.

In general, the shock data generated by an accelerometer is a pulsed signal that is proportional to the acceleration of the system 42 in units of gravity. Specifically, a quotient between a width of the pulsed signals in μs ($T_1$) and a duty cycle of the pulsed signals in μs ($T_2$) is obtained. The quotient is then compared with a constant to obtain a difference. The difference is then scaled. Particularly, the unit of gravity (A(g)) is determined as follows, $$A(g) = 100\left(\frac{T_1}{T_2} - 0.05\right).$$

Five sets of A(g)'s are obtained and averaged to obtain $\overline{A(g)}$. A load factor ("LF") of the lawnmower 10 can subsequently be obtained as follows:

$$LF = 2^{\overline{A(g)}}.$$

LF obtained above represents a run time of 0.2 second, and is cumulative over a life span of the lawnmower 10.

In one construction, the accelerometers 432 are configured to have a sampling rate of 50 Hz. Once the GPS module 424 has been activated, the accelerometers 432 will start to monitor and to report shock data, such as the directions of the lawnmower 10 at the specified sampling rate. In the illustrated construction of the monitoring system 42 mounted on the lawnmower 10, many noise sources and noise harmonics generated by the lawnmower 10 are detectable by the accelerometers 432. For example, a standard engine for the lawnmower 10 operates at about 3600 RPM, which creates an engine vibration of about 60 Hz as the piston reciprocates within the engine 28. That is, the vibrating engine 28 can generate shock forces that are detectable by the accelerometers 432 at a frequency of about 60 Hz. Rotating cutting blades can also generate high frequency signals that may be detected by the accelerometers 432. Furthermore, a shock load will be generated when the lawnmower 10 hits a curb or other similar object. The shock load is also generally detectable by the accelerometers 432.

Figure 5:
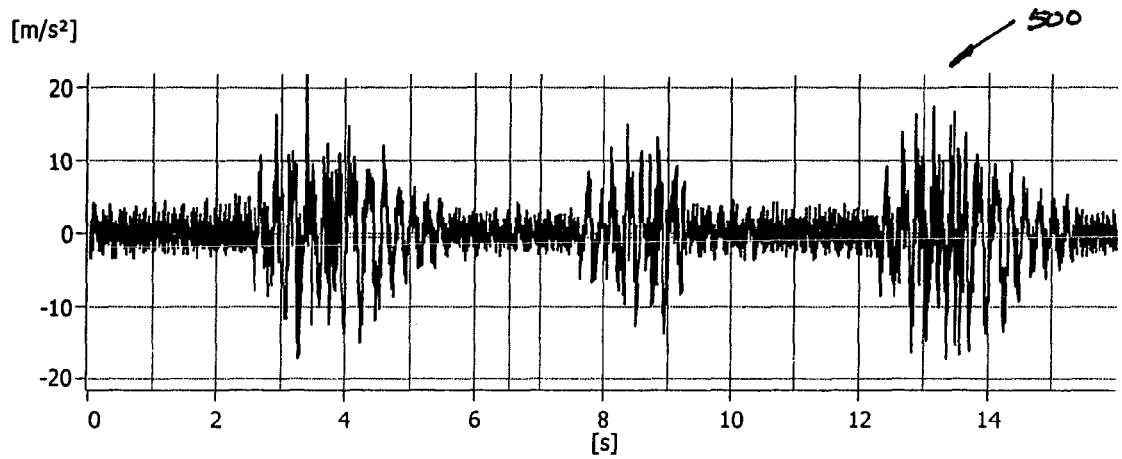
FIG. 5 shows up-down shock versus time plot.

FIG. 5 illustrates an up-down shock (vertical acceleration, in acceleration units) versus time plot 500 detected by the accelerometer 432 mounted on the lawnmower 10 over a period of 16 seconds. Plot 500 also shows that there are three sequences of signals from 2.5 second to 5.5 second, from 7.5 second to 9.3 second, and from 12.5 second to 15.5 second, respectively. Each of these sequences demonstrates an up and down shock of the lawnmower 10. To generate plot 500, the lawnmower 10 was driven across a test path with spaced bumps on the path. The lawnmower 10 encountered the bumps at about 3.5 seconds, 8.5 seconds, and 13 seconds, which are represented by the relatively larger signals sensed by the accelerometers 432. The smaller signals which are constantly present on plot 500 are generally caused by relatively constant vibration or interference noise generated by the lawnmower 10 itself.

Figure 6:
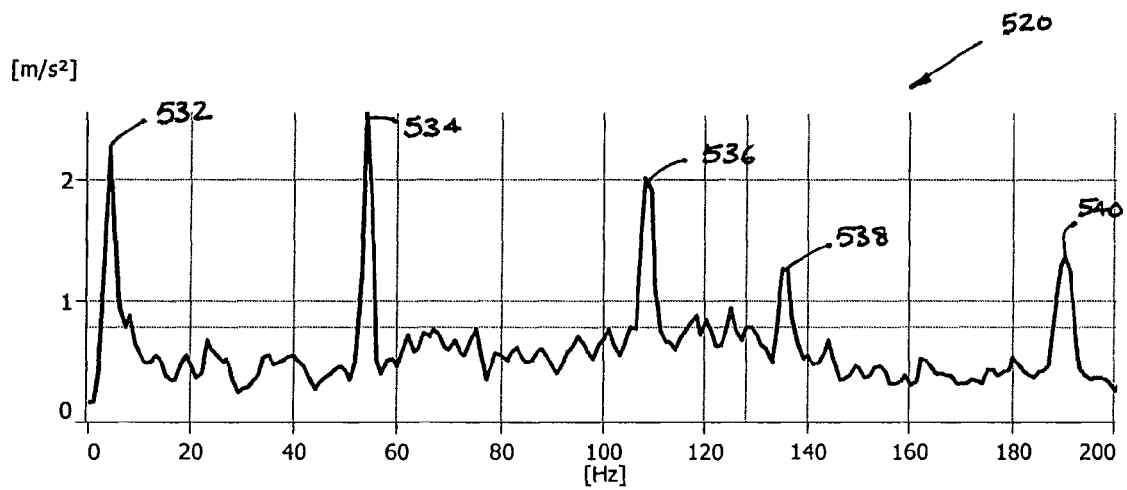
FIG. 6 shows a spectrum plot of the up-down shock plot of FIG. 5.
Figure 7:
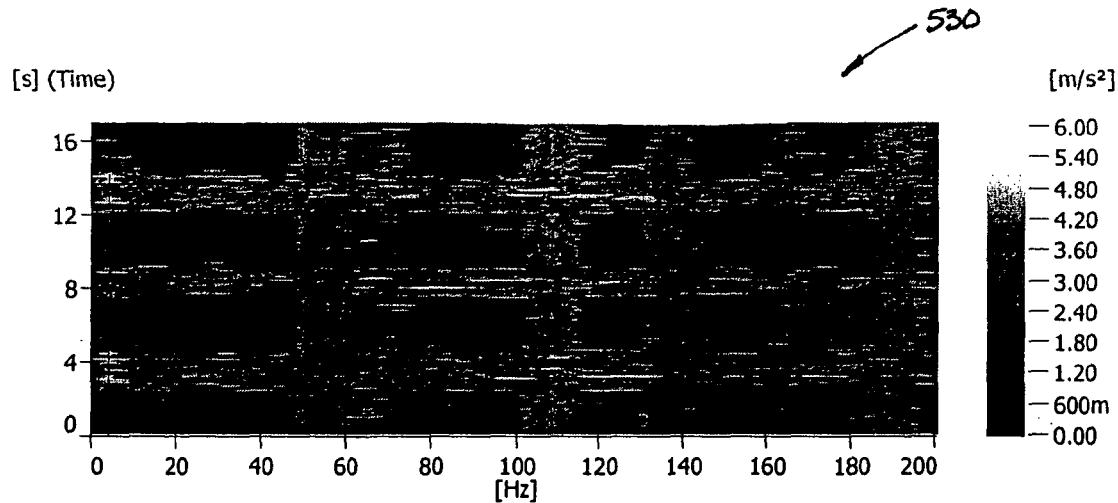
FIG. 7 shows a spectrogram of the up-down shock plot of FIG. 5.

FIGS. 6–7 illustrate a spectrum plot 520 and a spectrogram plot 530, respectively, and represent the frequency of the signals of FIG. 5. Since the spectrum plot 520 is essentially a time slice of the spectrogram plot 530, only the details of the spectrogram 530 will be discussed. The spectrogram 530 shows that there are high-energy bands (light colored band) present at about 5 Hz, 55 Hz, 110 Hz, 135 Hz, and 190 Hz, each representing spikes 532, 534, 536, 538, and 540 in plot 520, respectively.

Each of the spikes 532, 534, 536, 538, and 540 also represents strong shock loads sensed by an accelerometer 432 at a respective frequency. The monitoring system 42 is primarily focused in sensing shock loads that occur irregularly or at a relatively low frequency, since these shock loads are generally more indicative of the performance, movement or operation of the lawnmower 10 or outdoor power implement. For example, spike 532 may represent a one-time shock load (from hitting a curb or other object), because it occurs at a relatively low frequency of about 5 HZ.

Spike 534 represents shock loads sensed by the accelerometers 432 due to engine vibration. As mentioned above, an average lawnmower engine operates at about 3600 RPM, which creates an engine vibration of about 60 Hz. Spike 534 occurs at about 55 HZ, which is close to the 60 HZ, and indicates the engine is operating at slightly under 3600 RPM. Spikes 536 and 540 represent a multiples of the engine vibration. Spike 538 represents shock loads sensed by accelerometers due to a rotating blade of the lawnmower 10. These engine and rotating blade vibrations occurring at various frequencies may also experience constructive or destructive interference to generate other vibration readings that may be sensed by the accelerometers.

As a result, the shock data is generally conditioned through a lowpass filter 436 in the filtering module 416 to filter out some of the undesirable signals or noise. FIGS. 5–7 illustrate test data from accelerometers 432 before being passed through a filtering module 416. In the construction discussed, the filter 436 has a cutoff frequency of 50 Hz, which eliminates the engine vibrations sensed at about 60 HZ. However, other cutoff frequencies can also be implemented depending on the operating conditions. Many types of filter implementation may be used to realize such a lowpass filter. For example, a resistor-capacitor combination circuit is used in one construction. A digital Butterworth filter implemented specifically for the micro-controller 408 may also be used.

The filtered shock data is further conditioned through a second filter or a weighed averaging module 440. For example, the weighed averaging module 440 first weighs a number of the filtered shock data, and averages the weighed data over the number. In the construction discussed, the number of the filtered shock data is five. Consequently, each of the five shock data points is weighed, and is added to a total. The weighed average is subsequently obtained by dividing the total by five. The weighed average is then stored in a storage module 444. In the construction discussed, the storage module 444 may include an electrically erasable programmable read-only memory ("EEPROM") 448, such as EEPROM 24LC515 available from Microchip Technology, Inc. of Chandler, Ariz., included in the storage module 444 at a pre-determined recording rate. In the construction discussed, the recording rate is at 10 Hz. Optionally, the averaging can weigh heavier on the current data and relatively lighter on the past data. Furthermore, the storage module 444 can also include other types of memories such as a removable hard drive, and a floppy disk. The weighed average is optionally time stamped before being stored, or a cumulative power take-off ("PTO") time can be stored together with the weighed average. Meanwhile, the temperature sensor 428 continues to sense the ambient temperature. When the weighed average and the time are stored, the micro-controller 408 will also fetch for a current ambient temperature reading, and the ambient temperature will be stored with the weighed average and the time in the memory module 444.

Referring back to FIG. 4, similar to the temperature sensor 428, the micro-controller 424 receives from the GPS module 424 periodic global positioning data regarding the lawnmower via an antenna 452. The global positioning data includes, but is not limited to, time, date, location, magnetic heading, speed over ground, and acquisition status. The speed over ground data and the magnetic heading data are both extracted in the data extraction module 412. The extracted speed and magnetic heading are both periodically stored in the storage module 444.

The data stored in the memory module 444 can be accessed via a user-interface 456 or a communication module 458. The user-interface 456 includes a display 460, a keypad 464, buttons, and the like. For example, when a menu button on the keypad 464 is pressed, the display 460 will display a plurality of menu options. (Details of such is discussed hereinafter.)

The communication module 458 allows the data to be loaded or transmitted wirelessly. For example, the communication module 458 includes a serial port that can be coupled to a personal computer in the construction discussed. In other constructions, the communication module 458 may include a parallel port to be coupled to a printer, and a universal serial bus ("USB") port. In still another construction, the communication module 458 can be configured to transmit data wirelessly using a radio-frequency synthesizer, a radio-frequency transmitter, and the antenna 452. In still another construction, the communication module 458 can also be configured to receive data wirelessly using a radio-frequency receiver and the antenna. In this way, the system 42 can be programmed wirelessly to perform or record additional functions and data. In still another construction, the communication module 458 can be configured to transmit and receiver data wirelessly with a radio-frequency transceiver and the antenna 452.

Figure 8:
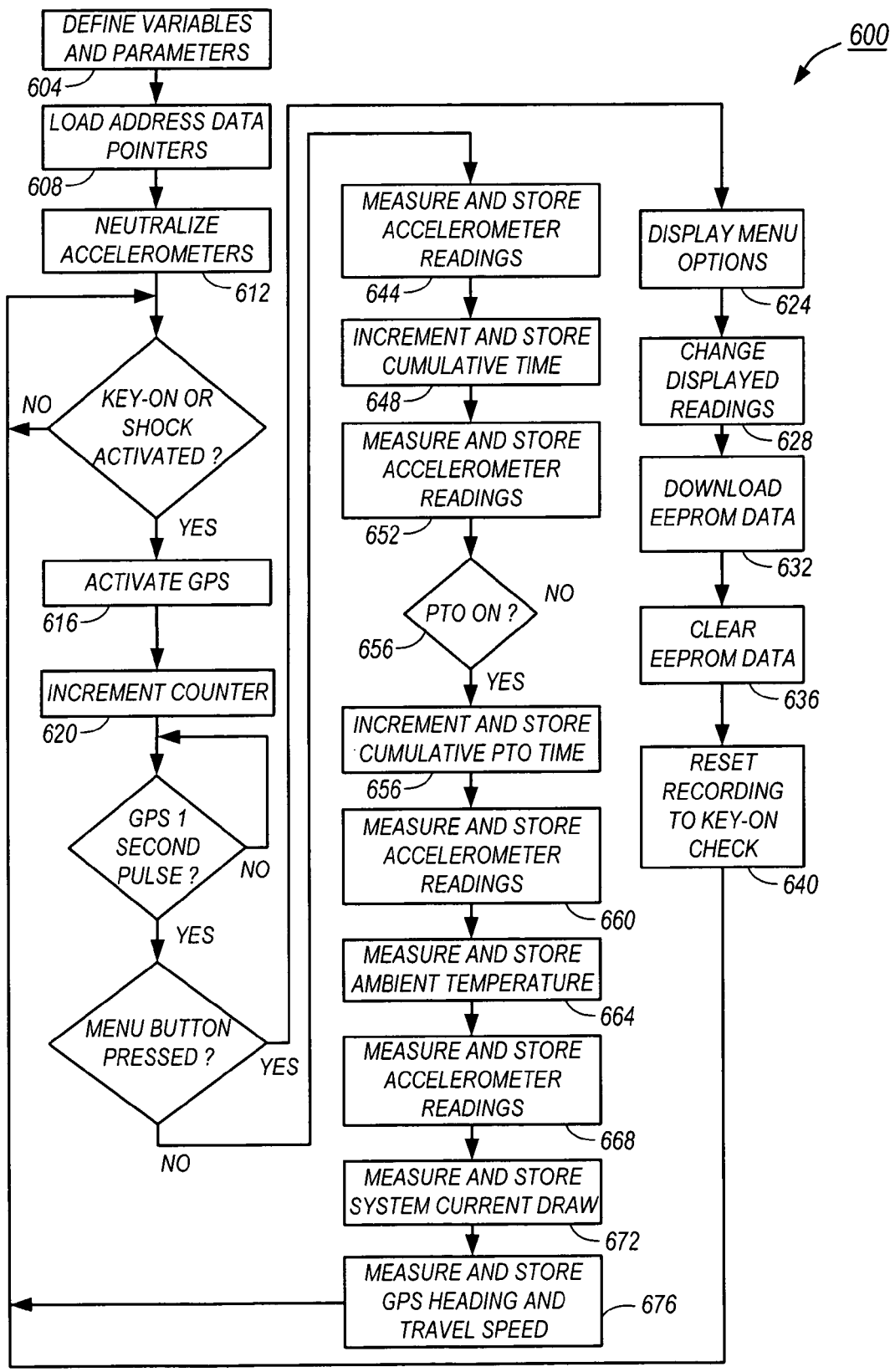
FIG. 8 illustrates an operational flow diagram of the system in FIG. 4 according to the present invention.

FIG. 8 illustrates an operational flow diagram 600 of the system 42. Once the system 42 is powered, a variety of parameters including system variables and parameters are defined at step 604. Pointers to data used by the processing module 404 are loaded at step 608. The accelerometers 432 are subsequently neutralized at step 612. When there is a shock or a key activation, the GPS module 424 is activated at step 616. At step 620, an operation cycle counter is initialized and incremented. After a one-second GPS pulse has been received, the system 42 checks to see if the keypad buttons 464 have been depressed. If the keypad buttons 464 have been depressed, the display 460 displays a plurality of menu options at step 624. The readings on the display 460 from the variety of sensors such as 428 and 430 are then updated at step 628. User generally has an option of downloading the data stored in the storage module 444. When the downloading option is chosen, the data stored in the storage module 444 is downloaded at step 632, and thereafter cleared at step 636. The system 42 is then reset to wait for a key activation at step 640.

However, when no menu button has been depressed, the shock data is measured by the accelerometer and conditioned by the filter 436 as described above. The conditioned data will be weighed by the scaling module 440 and stored in the storage module 444 at step 644. A cumulative time is incremented and stored in the storage module 444 at step 648. The shock data is again measured, conditioned, weighed and stored in the storage module 444 at step 652. The cumulative time is again incremented and stored in the storage module 444 at step 656 if PTO is on. After the shock data is once again measured, conditioned, weighed and stored in the storage module 444 at step 660, an ambient temperature is measured at the temperature sensor 428, and stored in the storage module 444 at step 664. After the shock data is again measured, conditioned, weighed and stored in the storage module 444 at step 668, an amount of current drawn detected by the current sensor 430 is measured and stored in the storage module 444 at step 672. Thereafter, the magnetic heading and travel speed is extracted from the GPS data, and stored in the storage module 444 at step 676. The system 42 then returns to check if the key-on is activated.

One possible use for the monitoring system 42 is for testing. The monitoring system 42 may be connected to a lawnmower 10 which is run through a battery of tests. The data from the monitoring system 42 may then be analyzed to determine the performance of the lawnmower 10. Similarly, the monitoring system 42 may be connected to a lawnmower or other outdoor power implement having new features, such as a chassis design, and the data obtained by the monitoring system 42 may be analyzed to determine the effectiveness of the new feature. This application may be helpful to the develop and testing of new products.

Another possible use for the monitoring system 42 is to monitor maintenance needs of the lawnmower 10. The timer automatically measures the operational time period for the lawnmower 10 each time the lawnmower 10 is operated. The monitoring system 42 stores the time data from the timer and accumulates the operational time periods over the life of the lawnmower 10. In some constructions, the monitoring system 42 is programmed with a maintenance time period for regularly scheduled maintenance on the lawnmower 10. When the operational time period equals the maintenance time period, a maintenance indicator is activated to alert the operator that regularly scheduled maintenance should be performed.

For example, the cutting blade may require sharpening after 20 hours of use. The monitoring system 42 will continue to monitor the operational time period the lawnmower is in use. After the lawnmower 10 has experience 20 hours of use, the maintenance indicator is activated to alert the operator to sharpen the cutting blade. The user interface may provide the maintenance indicator as a message, a visual indicator, such as a light, or an audio indicator, such as an alarm. After performing the regularly scheduled maintenance, the operator may enter the maintenance into the user interface that the maintenance was completed to clear the maintenance indicator and reset the maintenance time period for the cutting blade. The monitoring system 42 may simultaneously monitor multiple maintenance requirements for the lawnmower 10.

Another possible use for the monitoring system 42 is to monitor the performance of a lawnmower 10 or other outdoor power implement that is subjected to unsupervised use. For example, a landscaping firm may operate a fleet of multiple lawnmowers 10 that are simultaneously being operated at various locations by employees of the company. Commercial lawnmowers 10 or other outdoor power implements are relatively expensive and generally represent a significant investment and a large portion of the capital assets of a landscaping firm. Proper use and care of the equipment is vital to obtaining optimal return on an investment in the equipment. A supervisor cannot simultaneously monitor the performance of all the lawnmowers, which may be scattered over a city or other geographic region.

The monitoring system 42 permits the owner, or supervisor, of the lawnmower 10 to monitor the use of the lawnmower 10 without actually being present. After the fleet of lawnmowers 10 is returned at the end of the day, the data from the monitoring system may be analyzed to determine if the lawnmower 10 was properly used. For example, excessive impact forces sensed by the accelerometer 432 may indicate the lawnmower 10 was driven roughly or in an abusive manner. Similarly, the time and position data stored by the monitoring system will indicate how long the lawnmower 10 was actually in use during the day. This data will help a supervisor evaluate the performance of the operators of the lawnmowers 10. Also, the time and position data may be helpful to maximize the cutting area that is obtainable while helping minimize the actual distance traveled.

The monitoring system 42 may receive descriptive information through the control panel 70 or user interface regarding the particular situation in which the lawnmower 10 is being used. As described above, the operator may enter operator identification data, job identification data, and machine identification data into the monitoring system 42 before beginning each job. The monitoring system 42 store the descriptive information along with the performance data sensed during operation of the lawnmower 10. For example, each operator may have a specific operator code that is entered in to the monitoring system 42 to identify which operator was using the lawnmower 10 for each recording period. Similarly, each job or location may have a specific job code to identify that the lawnmower 10 was used to perform that specific job. Also, each lawnmower 10 may have a specific machine code to identify which lawnmower was being used during that recording period. An individual monitoring system 42 may be used with several operators, at several jobs, and on several different machines. The descriptive information will provide additional data to analyze the operating conditions of the lawnmower 10 and allow information for a specific operator, job or machine to be compared.

As described above, the monitoring system 42 is a self-contained modular unit. The modularity of the monitoring system 42 permits the monitoring system 42 to be easily connected to a lawnmower and then removed from the lawnmower. For example, monitoring systems 42 may be mounted on each of multiple lawnmowers 10 at the beginning of an operational period, such as a day or shift, and the monitoring systems 42 may then removed from the lawnmowers 10 at the end of the operational period. The supervisor may collect the modular monitoring systems 42 and return the units to a centralized location to analyze the data. Alternatively, the supervisor may transmit the data from each monitoring system 42 to an external device, such as a laptop computer, at the end of the operational period. The monitoring systems 42 may remain connected to the lawnmower 42 during transmission of the data.

The modularity of the monitoring systems 42 also permits the systems 42 to be selectively placed on desired lawnmowers 10 from a fleet. For example, a fleet of lawnmowers 10 may include ten lawnmowers, however, not all of the lawnmowers may be simultaneously in use. If only eight lawnmowers are being used simultaneously, then only eight monitoring systems 42 may be required to monitor the lawnmowers, instead of ten. Some lawnmowers may be receiving maintenance, or may simply not be in use. Therefore, the monitoring system 42 may be rotated among a larger number of lawnmowers, and fewer monitoring systems 42 are needed to monitor the fleet of lawnmowers than the actual numbers of lawnmowers in the fleet.

Additionally, the modularity of the monitoring system 42 permits retrofitting and customization of existing lawnmowers. The monitoring system 42 may be connected to existing lawnmowers after market. Therefore, an entire new lawnmower is not necessary to obtain the features of the monitoring system 42. The data obtained from the monitoring system 42 may help an operator reduce the stress on a lawnmower 10 and prolong the useful life of the lawnmower 10.

The foregoing detailed description describes only a few of the many forms that the present invention can take, and should therefore be taken as illustrative rather than limiting. It is only the claims, including all equivalents that are intended to define the scope of the invention.

The invention claimed is:

1. A lawnmower comprising:
a frame;
an engine supported by the frame;
a mower deck supported by the frame;
a cutting implement disposed below the mower deck and rotationally driven by the engine;
a self-contained modular monitoring system for recording operational data of the lawnmower, the monitoring system including:
a microprocessor;
a memory;
an accelerometer for measuring impact force data of the lawnmower;
a signal conditioning circuit connecting the accelerometer to the microprocessor for transferring the impact force data, the signal conditioning circuit filtering the impact force data and providing filtered impact data that is scaled to parameters of the lawnmower, the filtered impact data being saved in the memory; and
a GPS receiver for collecting position data of the lawnmower, the GPS receiver being connected to the microprocessor and the position data being saved in the memory.

2. The lawnmower of claim 1, wherein the lawnmower comprises an electrical system including a power source and the monitoring system includes a power take-off for connecting the monitoring system to the power source of the lawnmower and providing power to the monitoring system.

3. The lawnmower of claim 2, wherein the monitoring system includes electrical sensors for measuring current, voltage and ambient temperature of the electrical system and transmitting data to the microprocessor regarding operation of the electrical system.

4. The lawnmower of claim 1, further comprising a user interface having a visual display and input buttons for interfacing with the monitoring system.

5. The lawnmower of claim 4, wherein the user interface is operable to receive an operator identification and a job identification entered by an operator of the lawnmower, the operator identification and the job identification being saved in the memory.

6. The lawnmower of claim 1, wherein the monitoring system further comprises a cutting implement sensor for sensing operation of the cutting implement and transmitting data to the microprocessor regarding operation of the cutting implement with respect to time.

7. The lawnmower of claim 1, further comprising at least two wheels supporting the frame, the lawnmower being suspension-less and the wheels being fixed with respect to the frame in a vertical direction.

8. The lawnmower of claim 1, wherein the signal conditioning circuit includes a filter module comprises a resistor capacitor filter circuit having a cutoff frequency at 50 Hz.

9. The lawnmower of claim 8, wherein the filter module comprises a weighed averaging module configured to generate a weighed average using the impact force data.

10. The lawnmower of claim 1, wherein the accelerometer measures impact forces in at least three directions.

11. The lawnmower of claim 1, wherein the monitoring system further comprises a communication module operable to transfer data from the monitoring system to an external device.

12. The lawnmower of claim 1, wherein the monitoring system automatically begins recording the output data and position data when the GPS receiver senses movement of the outdoor power implement.

13. The lawnmower of claim 1, wherein the monitoring system further comprises a time keeping device coupled to the processing module for measuring an operational time period the lawnmower is in operation, the monitoring system including a database of a maintenance time period for regularly scheduled maintenance and providing a maintenance indicator in response to the operational time period equaling the maintenance time period, the operational time period being saved in the memory.

14. The lawnmower of claim 13, further comprising a user interface including a visual display and input buttons for interfacing with the monitoring system, the user interface displaying the maintenance indicator and being operable to clear the maintenance indicator and reset the operational time period, the display of the maintenance indicator and the clearance of the maintenance indicator being saved in the memory.

15. The lawnmower of claim 13, wherein the monitoring system automatically begins recording the operational time period in response to operation of the lawnmower.

* * * * *